Dec. 11, 1951        E. J. NICHOLL        2,578,200
MECHANISM TO MINIMIZE PITCHING IN BRAKED
AIRCRAFT BOGIE UNDERCARRIAGE

Filed May 18, 1949        3 Sheets-Sheet 1

Inventor
EDWARD JAMES NICHOLL,
by Reynolds & Beach
Attorneys

INVENTOR.
EDWARD J. NICHOLL
BY
Reynolds Beach
ATTORNEYS

Dec. 11, 1951  E. J. NICHOLL  2,578,200
MECHANISM TO MINIMIZE PITCHING IN BRAKED
AIRCRAFT BOGIE UNDERCARRIAGE
Filed May 18, 1949  3 Sheets-Sheet 3

INVENTOR.
EDWARD J. NICHOLL
BY
Reynolds Beach
ATTORNEYS

Patented Dec. 11, 1951

2,578,200

UNITED STATES PATENT OFFICE 2,578,200

MECHANISM TO MINIMIZE PITCHING IN BRAKED AIRCRAFT BOGIE UNDER-CARRIAGES

Edward J. Nicholl, Charlton Kings, Cheltenham, England, assignor to Dowty Equipment Limited, Arle Court, Cheltenham, England Application May 18, 1949, Serial No. 93,966
In Great Britain July 26, 1948

5 Claims. (Cl. 244—104)

The present invention consists in an aircraft bogie undercarriage in which forward and rear land wheels are connected with a supporting leg by levers which extend respectively fore and aft from pivotal attachments of the latter with the leg and are swingable up and down against restraint provided by one or more shock absorbers, and in which brake torque of non-rotating elements of brakes associated with the wheels is transmitted by means directly connecting the elements with the leg.

The points of connection of each brake torque transmitting means with the leg and corresponding brake element will preferably be so chosen with the parts substantially in the position they occupy in a static condition of the undercarriage with the weight of the aircraft acting thereon, that the resultant of the forces acting on the corresponding wheel during braking will lie in a plane containing the axes of the lever pivot and wheel spindle. Such resultant force has no moment about the point of connection of the lever with the leg, and thus does not create any tendency for pitching. By "pitching" is meant the tendency for the wheel or wheels at one side of the leg (say the leading wheels) to move up or down while the wheel or wheels at the other side of the leg (the trailing wheels) are tending to move down or up respectively.

It will be understood that pitching to any appreciable extent is undesirable as it results in uneven loads on the wheels with consequent uneven braking effect and possible skidding. Each linkage system comprising the brake torque transmitting means and the lever by which the wheel spindle is connected with the leg will preferably be so proportioned that swinging of the systems about the leg during braked taxying will result in a minimum deviation of the plane of said resultant force from that containing the axes of the lever pivot and wheel spindle.

The invention is applicable to bogie undercarriages having brakes of either drum or plate type.

Figure 1:
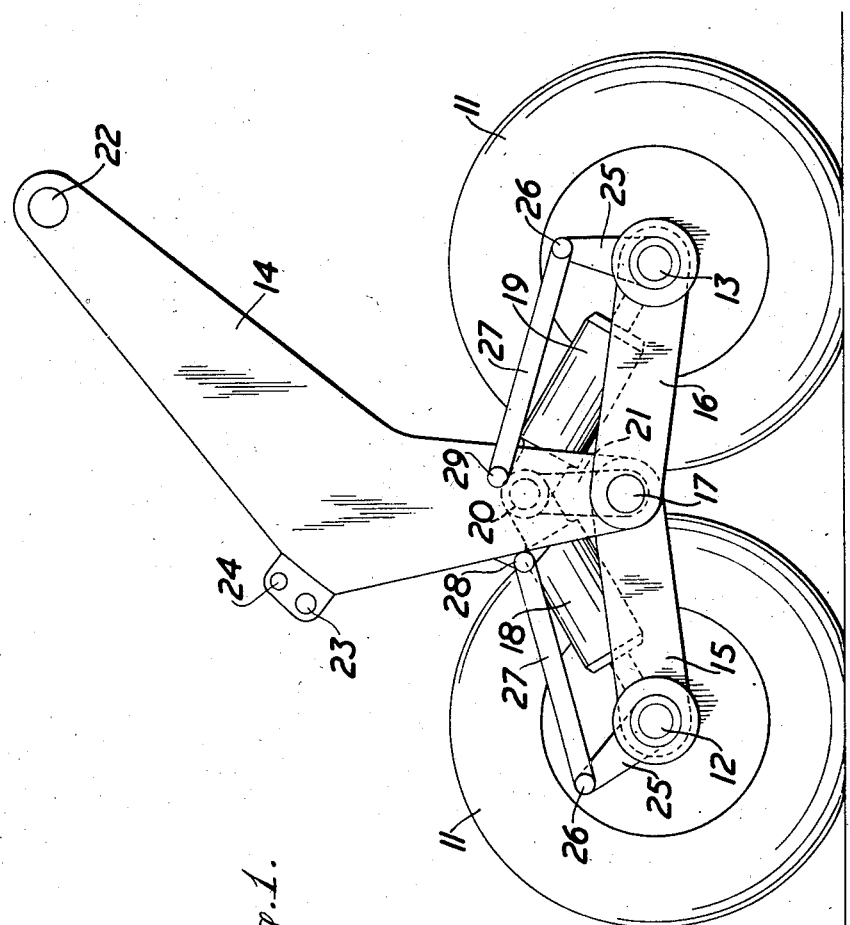
Figure 2:
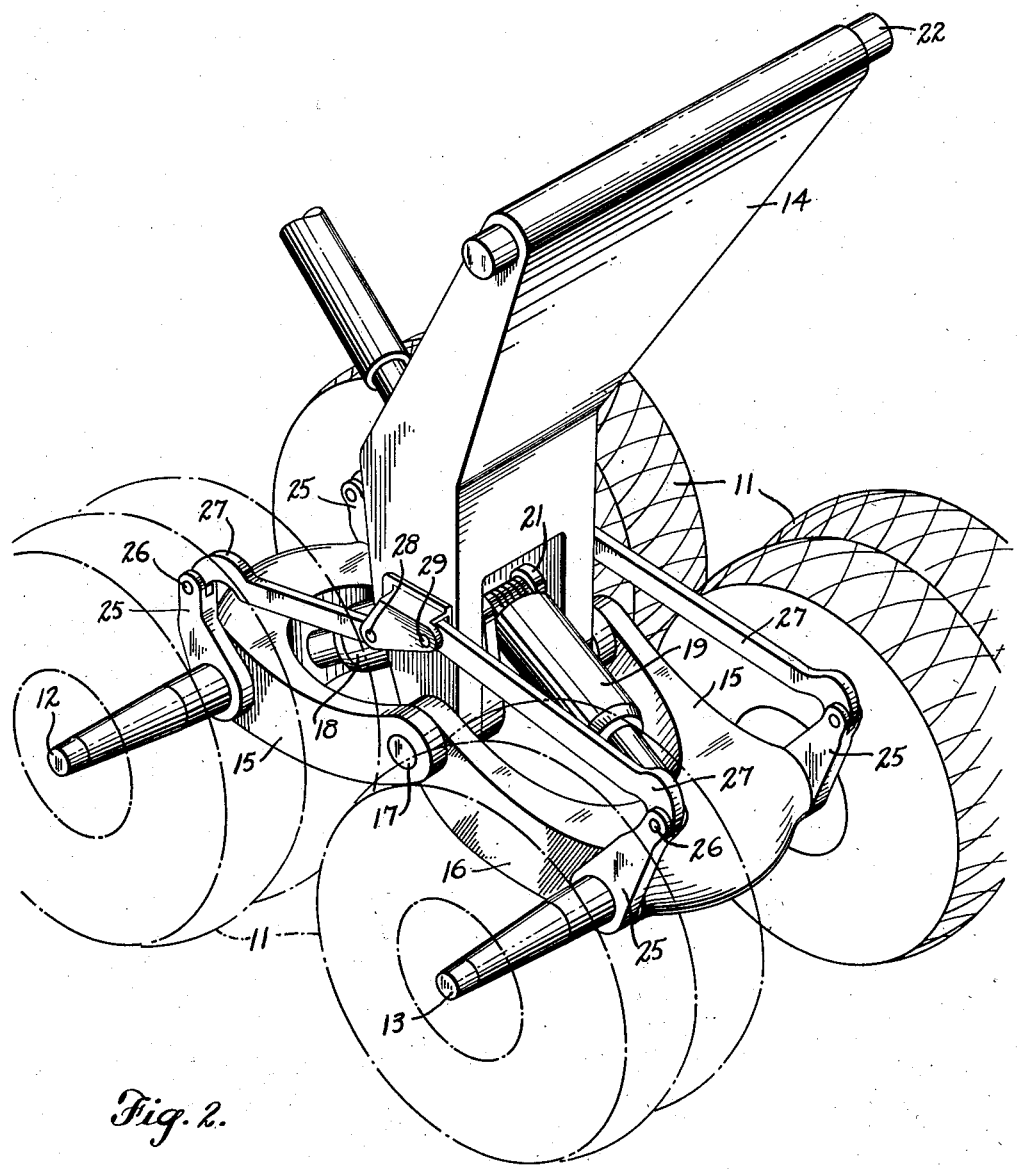
Figure 3:
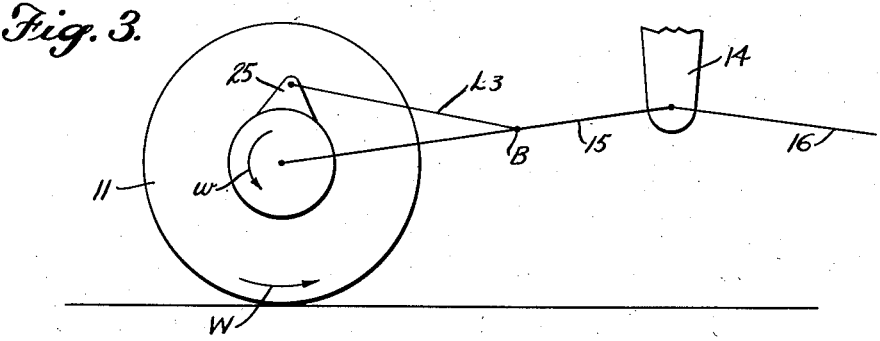
Figure 4:
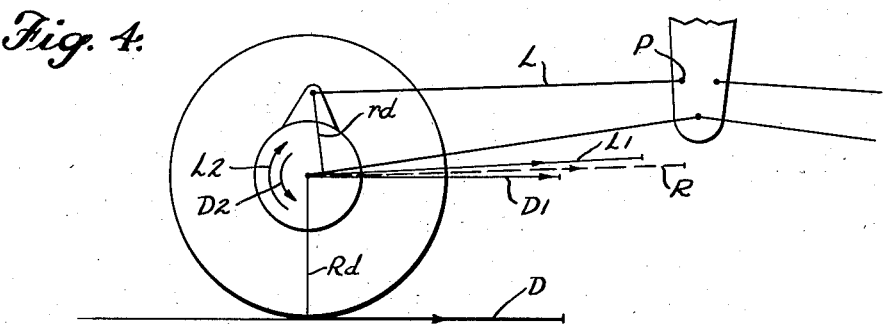
Figure 5:
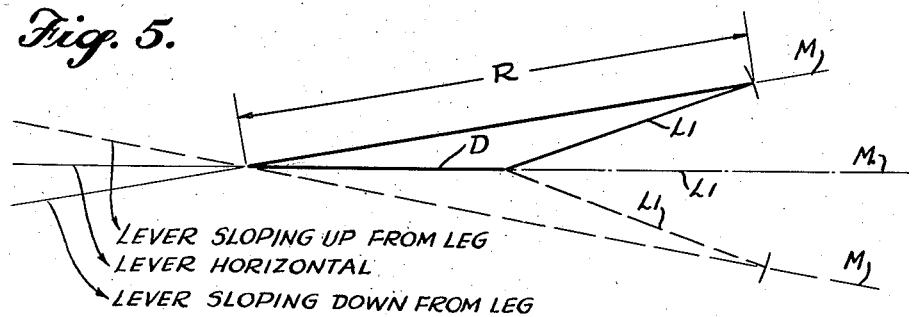

The preferred form of the invention will now be described with reference to the accompanying drawings, wherein Figure 1 is a diagrammatic side elevation with the near side wheels removed; Figure 2 is an isometric view of the actual construction; and Figures 3, 4, and 5 are force and vector diagrams.

The bogie undercarriage shown comprises four double wheels 11 of which the two near side double wheels are removed for clarity of illustration in Figures 1 and 2. The wheels 11 are rotatable about two parallel axes 12 and 13 arranged equal distances fore and aft of the main supporting leg 14 with which the wheel spindles are connected by a pair of levers 15 and 16 respectively which latter pivot about a common axis 17 at the lower end of the leg 14.

Up and down swinging of the levers 15 and 16 is resisted by two shock absorbers 18 and 19 which connect at one end with the corresponding wheel spindle and at the other end with a pin 20 on a link 21 which is freely pivoted about the common pivot 17 of the wheel-supporting levers 15 and 16. Any tendency for the wheel at one side of the leg to swing up is resisted by the corresponding shock absorber at that side of the leg and this shock absorber acts upon the link pin 20 to transmit part of the resistance to the other shock absorber. In this way resistance to swinging is shared equally by both shock absorbers 18 and 19 which reduces to a minimum the tendency for pitching during normal taxying. The link 21 may have a friction bearing at its journal about the axis 17. This link comprises an operative connection between the leg 14 and the interconnected ends of the shock absorbers and thereby transmits part of the weight load to the leg from the shock absorbers while permitting the interconnected ends of the latter to move laterally in relation to the leg as a result of interaction of such shock absorbers. It will be noted that each shock absorber and associated lever also act as an operative connection between the other shock absorber and the leg to transmit weight load to the latter from such other shock absorber. For broad purposes of the invention the nature of the operative connection or connections by which weight load is transmitted to the leg is not material and the connections may be direct or indirect.

If desired, the two shock absorbers 18 and 19 may be hydraulically interconnected, or they may be replaced by a single shock absorber.

In the example shown, the leg 14 is adapted to swing about a retraction axis 22 and is adapted to have a strut connected therewith at 23 and a retraction jack at 24.

Each double wheel 11 is fitted with a brake of the plate or drum type, and the non-rotating element of each brake has an outstanding arm 25 to which is pivotally attached at 26 one end of a torque transmitting link 27 the other end of which is pivoted at 28, for the forward links, and at 29, for the rearward links, directly upon the leg 14. There will thus be four torque transmitting links connecting the four double wheels with the leg, two forwardly of the leg and two rearwardly of the leg.

In order to understand the principle which governs the selection of the points of connection at 28 and 29, and the results which flow from selection of the correct points, reference is made to the diagrams, Figures 3, 4, and 5. Figure 3 represents an arrangement which has been used, but which has no purpose to, and does not actually, minimize pitching upon brake application, and may indeed aggravate the tendency to pitching under such conditions; Figure 4 represents a departure from the arrangement of Figure 3, but which, for lack of proper selection of the slope of the torque-transmitting link and of its point of connection to the leg 14, still fails to prevent pitching; and the vector diagram of Figure 5 represents the manner of arriving at the correct choice of such factors, according to the principles of this invention.

It is assumed, in each of the figures, that the wheels, resting on the ground, cooperate to support the static weight of the aircraft, and that all parts are in corresponding positions. This may be considered also a mean of the various positions assumed while taxying, and at a time when brake application is to be commenced.

Referring to Figures 3 and 4, wherein the wheel illustrated is assumed to be the forward wheel, rotating in the sense of the arrow W, the application of the brake will tend to turn the brake drum (or other nonrotative brake element) in the same rotative sense, $w$. This tendency must be resisted by an equal and opposite torque applied to the brake drum, and such a resistance is obtained by linking the brake drum or its arm 25 by way of $L_3$ (Figure 3) to some part other than the wheel 11, e. g., to the leg 14 or lever 15.

Assuming first that the link $L_3$ (corresponding generally to link 27) extends from the brake drum to the lever 15, as shown in Figure 3—this being not in accordance with, but rather opposed to, the present invention—the point of attachment at B of the link $L_3$ with the lever 15 will try to turn with the brake drum (arrow $w$) about the axis of the wheel. This will impart a moment to the lever 15 which is reacted by increased load in the tire, and undesirably, sometimes dangerously, overloads the latter. This arrangement is known, and the reaction mentioned has caused burst tires in actual use.

Next, instead of connecting the link to the lever, assume that the brake drum is linked to the leg 14, as in Figure 4. Such connection, unless the point thereof is correctly chosen, does not remove all pitching tendency.

The application of the brake creates a drag load which may be represented by the vector D. This vector D may be resolved into a force $D1$ and a torque $D2$. The load D multiplied by the distance $Rd$ equals the torque $D2$ and the force $D1$ equals the force D. The tendency for the brake drum to turn with the wheel (equal to the torque $D2$) is resisted by the load L in the link. This load may also be resolved into $L1$ and the torque $L2$. L multiplied by the distance $rd$ equals the torque $L2$ and the force $L1$ equals the force L. As $L2$ and $D2$ are equal and opposite, they cancel one another leaving forces $L1$ and $D1$ to be resolved. These can be resolved into the force R which is thus the resultant of the system. In Figure 4 it will be seen that this resultant R tends to pull the wheel axle down towards the ground and therefore does introduce a pitching tendency. This is because in the sketch the point P of the connection between the link and the leg has not been chosen correctly. If this point were made high enough up the leg the resultant R would move up through the lever to some position above the lever in which case the resultant would tend to lift the wheel away from the ground. It follows that if the point P be correctly selected, the resultant R will be coincident with the lever which latter will then be in compression without there being any turning moment.

In determining the correct position for the point P it is necessary from available data to draw a vector diagram, Figure 5. Firstly the indeterminate line M is drawn at an angle corresponding with the angle of the wheel-supporting lever under mean static load conditions. Then from some point the vector D of the brake drag is drawn in a horizontal direction. The length of this is unity. The force L in the link is next determined in terms of D from available data $Rd$ and $rd$ and the vector $L1$ representing this is drawn to meet the line M. We now have a triangle of forces where R is the resultant. The link must then extend to the leg at an angle agreeing with the slope of the vector $L1$. The resultant of the vector diagram R will then act along the lever. It will be clear that if initially the line M were horizontal then D which is also drawn horizontal, and L would be in alignment so that the link would have to be parallel with the lever. It will also be seen that if the lever should slope up from the left the vector $L1$ will slope so that it diverges with respect to the lever away from the leg. In the first example given, the link converges with respect to the lever away from the leg.

From these remarks it will be seen that although it is an advantage to anchor the brake drum directly with the leg, it is a still further advantage to place the point of connection between the link and leg at a special position, as illustrated in Figure 1 for a particular installation. Incidentally, although the angle the link makes with the leg is all important, its length is of no consequence. It is to be understood that the lever angle is the one the lever occupies in a static position of the aircraft. This is considered to be a mean position so that deviations from the ideal condition are minimized.

I claim:

1. In an aircraft undercarriage, forward and rear landing wheels, an intermediate supporting leg, levers pivotally connected each to the leg to swing upwardly and downwardly, and extending, respectively, forwardly and rearwardly, and rotatively mounting the respective wheels upon their swinging ends, shock absorber means operatively connected between said leg and the respective levers and positioning each such lever under mean static load conditions, in a generally definite angular relationship with the leg, brake means operatively associated with each wheel, and including a nonrotative brake arm subject to braking torque, and torque-resisting means reacting directly between each brake arm and the leg.

2. An aircraft undercarriage as in claim 1, characterized in that the point of connection of each torque-resisting means to the leg is so located that the resultant of the forces acting on the corresponding wheel resulting from braking of the wheel will lie in a plane common to the axis of the lever's pivot on the leg and the wheel's rotative axis with the parts located substantially as under mean static load conditions for the particular airplane.

3. An aircraft undercarriage as in claim 1, characterized in that each torque-resisting means is effectively directed from its brake arm connection to its connection on the leg at such angle, relative to the angular position of the corresponding wheel-supporting lever under mean load conditions for the particular airplane, that the resultant of the forces arising from braking of the wheel will generally coincide with said lever, and produce zero torque therein.

4. An aircraft undercarriage as in claim 1, wherein the shock absorber means includes two shock absorbers each connected at one end to the swinging end of the corresponding lever, and the two connected together at their other ends, to transmit loads from one to the other, and means interconnecting the leg and the interconnected ends of such shock absorbers to transmit weight load from the leg to such interconnected ends while permitting movement of such ends generally laterally with relation to said leg.

5. An aircraft undercarriage as in claim 1, including a link pivotally mounted at one end upon the leg, and wherein the resilient means includes two telescoping shock absorbers each connected at one end to the swinging end of the corresponding lever, and both connected in common to the swinging end of said latter link.

EDWARD J. NICHOLL.

REFERENCES CITED

The following references are of record in the file of this patent:

UNITED STATES PATENTS

| Number | Name | Date |
| --- | --- | --- |
| 1,653,361 | Krammer | Dec. 20, 1927 |
| 1,851,129 | Reardan | Mar. 29, 1932 |
| 2,083,166 | Jonkhoff | June 8, 1937 |
| 2,130,914 | Warren | Sept. 20, 1938 |
| 2,176,172 | Flowers | Oct. 17, 1939 |
| 2,386,620 | Loyd | Oct. 9, 1945 |
| 2,403,833 | Spangler | July 9, 1946 |